United States Patent
Campbell

[11] 3,733,972
[45] May 22, 1973

[54] SERVOMOTOR

[75] Inventor: David D. Campbell, Lake Orion, Mich.

[73] Assignee: General Motors Corporation, Detroit, Mich.

[22] Filed: Dec. 10, 1970

[21] Appl. No.: 96,740

Related U.S. Application Data

[62] Division of Ser. No. 849,321, Aug. 12, 1969, Pat. No. 3,603,425.

[52] U.S. Cl. .............................92/37, 92/43, 251/60
[51] Int. Cl. ............................F01b 19/00, F16j 3/00
[58] Field of Search....................92/34, 40, 37, 35, 92/43

[56] References Cited

UNITED STATES PATENTS

| | | | |
|---|---|---|---|
| 2,616,451 | 11/1952 | Hunter | 92/35 X |
| 3,162,335 | 12/1964 | Kogan et al. | 92/35 X |
| 2,593,848 | 4/1952 | Clausen | 92/40 X |
| 2,747,614 | 5/1956 | Gray | 92/40 X |
| 2,896,584 | 7/1959 | Ayers, Jr. et al. | 92/40 X |
| 2,966,224 | 12/1960 | Teetor | 180/109 X |

Primary Examiner—Martin P. Schwadron
Assistant Examiner—Abe Hershkovitz
Attorney—Frank J. Soucek et al.

[57] ABSTRACT

A servomotor assembly having application in a vehicle cruise control system including an annular pleated bellows member having a fixed wall closing one end and a movable wall closing the other end defining a fluid pressure control chamber therein. A coil spring is disposed within the bellows member biasing the walls apart. The bellows member and the walls contain central openings receiving a control rod therethrough upon which is mounted a slidably adjustable stop member. The stop member is positioned for engagement by the movable wall during contraction of the bellows thereby actuating the control rod in accordance with the prevailing pressure fluid within the bellows member.

1 Claim, 2 Drawing Figures

PATENTED MAY 22 1973 3,733,972

INVENTOR.
David D. Campbell
BY
C. R. Engle
ATTORNEY

SERVOMOTOR

This application is a division of application Ser. No. 849,321, filed Aug. 12, 1969 issued as U.S. Pat. No. 3,603,425 on Sept. 7, 1971.

This invention relates to an improved servomotor assembly and particularly to such an assembly capable of being mounted concentrically upon a control rod being actuated thereby without utilization of intermediate linkage members.

The servomotor assembly of the present invention has particular application in association with a vehicle cruise control system. In the past it has been common practice to utilize a fluid servomotor to actuate the throttle control rod in response to control pressures under the influence of a speed error responsive valve. These servomotors have normally been connected to the throttle rod through a flexible link or a linkage connection involving a somewhat complicated arrangement. Therefore it is a purpose of this invention to provide a servomotor assembly capable of being concentrically disposed about a control rod wherein a movable wall of the servomotor assembly engages either a surface of the control rod or a stop block secured to the rod thereby actuating the rod through direct engagement. It is obvious that this type of an arrangement lends for a more compact installation arrangement and further provides the advantage of a direct engagement of the control rod by the movable servomotor wall assuring reliable movement of the rod when the servomotor receives a pressure fluid requiring the same. This arrangement also provides the advantage of affording an adjustably slidable stop member on the control rod which can be positioned through a set screw engaging the rod or by other conventional means. Convenience of the adjustable stop member makes the servomotor adaptable to many operational environments.

As previously mentioned the subject servomotor assembly has particular application in conjunction with a vehicle road speed control system of the type employing a speed error responsive valve controlled by actual vehicle speed as set into the system by a vehicle operator. The speed control system incorporates a clutch member being held in a disengaged position when the system is not in use and being engaged with a vehicle speed responsive member when the system is placed in operation.

Engagement of the clutch connects the speed error responsive valve with the speed responsive member so that any deviation from the set speed results in movement of the valve regulating fluid to the servomotor assembly which accordingly actuates the control rod adjusting the throttle to obtain the set speed. A vehicle road speed control system of this type is shown in Hagler et al. U.S. Pat. No. 3,419,105 issued Dec. 31, 1968.

Among the objects of this invention is the provision of an improved servomotor assembly capable of receiving a control rod centrally therethrough for engagement by a movable member in response to fluid pressure changes within the servomotor.

Another object of this invention is the provision of a servomotor assembly eliminating the need for extraneous flexible or pivotal connecting linkages to actuate a control rod.

A further object of this invention is the provision of a servomotor assembly including a cylindrical bellows member having one end secured to a fixed wall and the other end secured to a movable wall, both walls containing centrally disposed apertures receiving a control rod.

A still further object of this invention is the provision of a servomotor assembly including a pleated cylindrical bellows member defining an outer surface of the servomotor and an inner cylindrical pleated bellows member defining an inner surface of the servomotor, the inner member being concentrically disposed within the outer bellows member whereby a control rod is centrally located through the inner bellows members without passing through an annular fluid pressure chamber defined by the respective bellows members and end plates attached to the respective ends of the bellows members.

Another object of this invention is the provision of a servomotor assembly including concentrically disposed cylindrical bellows members defining an annular space being enclosed by a toroidal fixed plate at one end and a movable toroidal plate at the other end and having a control rod positioned within the center of the torus wherein a stop member is slidably positioned upon the control rod for precise engagement by the movable wall of the servo motor assembly.

Organization of structure of the subject invention and its method of operation together with further objects and advantages thereof will be best understood by reference to the following description taken in conjunction with the accompanying drawings in which.

Figure 1:
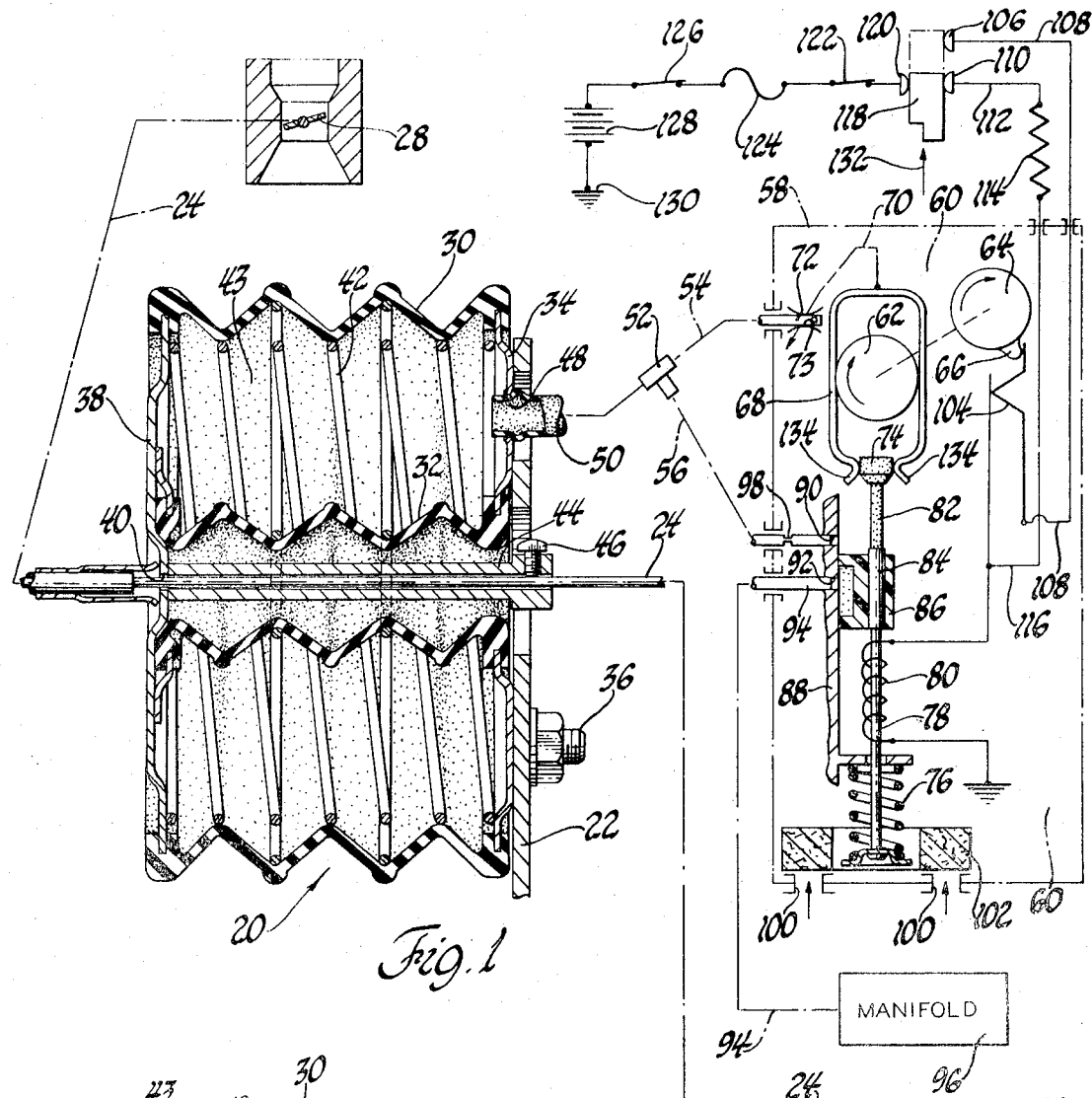
FIG. 1 is a schematic representation of a system utilizing the inventive servomotor assembly shown in cross-section.

The speed control system schematically illustrated in FIG. 1 includes a servomotor assembly 20 secured to a fixed support 22 concentrically about throttle control rod 24 actuated by accelerator pedal 26 normally controlling the position of throttle valve 28. The servomotor assembly 20 has an outer pleated cylindrical bellows member 30 concentrically located about a similar inner pleated bellows member 32 both of which have one end secured to a fixed toroidal end plate 34 secured to the support member 22 by means of bolt 36. The other ends of bellows 30 and inner bellows 32 also define a toroidal area closed by a movable plate 38 containing a centrally positioned aperture 40 for a purpose later described. A spring 42 is placed within a fluid control chamber 43 defined by the bellows members 30 and 32 and engages the fixed wall 34 to bias movable wall 38 to an expanded position shown in FIG. 1. A stop block 44 in the form of a cylindrical sleeve is slidably positioned upon the throttle control rod 24 and is retained in a preselected position by a set screw 46.

Fixed wall 34 contains an aperture 48 fixedly receiving a conduit 50 containing a Tee connecting member 52 joining conduits 54 and 56 with the aforementioned conduit 50. The conduits 54 and 56 connect with a speed responsive transducer housing 58 containing an atmospheric pressure chamber 60. A clutch member 62 is rotatably mounted within transducer housing 58 and is connected to be driven through a magnetic coupling in the speedometer drive arrangement so that the clutch member 62 is positioned in relation to the prevailing vehicle speed. The clutch member 62 is also fixedly connected to a cam supporting member 64 which rotatably positions cam 66 with rotation of the clutch member 62. The cam supporting member 64 is axially spaced from the clutch member 62. A clutch spring 68 is connected through suitable linkage 70 to translate arcuate movement of clutch member 62 into linear movement of modulating slide valve 72 so that the valve may be positioned in relation to a set vehicle speed when the clutch spring 68 engages clutch member 62. The slide valve 72 is moved relative to circumferential apertures 73 modulating fluid flow through conduit 54 as shown in detail in the aforementioned patent to Hagler et al. U.S. Pat. No. 3,419,105. In the clutch disengaged position, a clutch control cam 74 biases the spring 68 apart and out of engagement with the clutch member 62 so that the vehicle is normally manually controlled through the accelerator pedal 26. In this condition spring 76 biases a solenoid armature 78 downwardly within a solenoid energizing coil 80. The solenoid armature 78 connects with a smaller cam section 82 which has a portion 84 retaining a slide valve member 86. A valve plate 88 is mounted within the transducer housing 58 and contains ports 90 and 92 receiving conduit 56 and a conduit 94 connecting with the vehicle manifold 96 respectively. The conduit 56 contains a restricting orifice member 98 delaying flow of fluid from atmospheric chamber 60 through the conduit 56 to the bellows control chamber 43. The lower portion of transducer housing 58 contains apertures 100 admitting atmospheric air into the chamber 60 through an annular air filter 102.

Solenoid coil 80 is in electrical circuitry with switch 104 which is a minimum speed switch actuated by cam 66. The cam 66 maintains switch 104 open prohibiting energization of coil 80 until the vehicle reaches a predetermined minimum vehicle speed. The minimum speed switch 104 is connected with a switch contact 106 by electrical lead 108. The contact 106 is in parallel circuitry with another contact switch 110 that is connected by a lead 112 to a resistance 114 that is in series connection with the solenoid actuating coil 80 via lead 116. A switch slide bar 118 is biased to a position normally connecting a contact 120 with the contact 110 completing the circuit including the resistance 114 to the solenoid actuating coil 80 when the minimum speed switch 104 is closed. The contact 120 is in series with a normally closed brake switch 122 maintaining the circuit closed until the brakes are applied at which time the circuit is opened and the selected speed is no longer set into the system. The normally closed brake switch 122, in turn, is in series circuit with a fuse 124 and an ignition switch 126 which is also in series with a battery source 128 connected to ground at 130.

Operation of this system is as follows. During low speed operation of the vehicle, for example at 20 m.p.h., the cam supporting member 64 has not rotated a sufficient distance to permit closure of switch 104 and while the slide bar 118 connects the resistor 114 in series with coil 80 to source 128, the power furnished coil 80 is insufficient to move armature 78 due to the resistor 114. Slide valve 86 is in the position shown so that conduit 56 receives atmospheric air from chamber 60 while the vacuum from manifold 96 in conduit 94 is constrained by the valve 86. As the vehicle speed increases above that for which cam 66 is set, switch 104 is allowed to close. Then when the vehicle reaches a speed at which the operator wishes to continue, the slide bar 118 is actuated in the direction of arrow 132 to momentarily connect all three contacts 106, 110 and 120 in the circuit with source 128. At this time power is supplied directly through contact 106 and minimum speed switch 104 to the coil 80. The resistance 114 is bypassed and coil 80 receives sufficient power to actuate solenoid armature 78 and move control cam 74 upwardly allowing spring 68 to close upon clutch member 62. At this time the ends 134 of spring 68 engage the smaller cam section 82 allowing the spring to tightly grip clutch member 62 and the slide valve 86 is moved connecting the ports 90 and 92 supplying vacuum through orifice 98 to control chamber 43. At the time of engagement, the clutch member 62 has rotated to a specific arcuate position in response to the speedometer drive mechanism so that the valve linkage 70 is connected to the clutch member 62 to establish a neutral position of valve 72 at a set speed. Any speed deviation from the set speed and consequent arcuate movement of clutch member 62 causes the valve 72 to be translated linearly relative to apertures 73 thereby controlling the effect of the vacuum from manifold 96 in the control chamber 43.

Should vehicle speed drop below the desired set speed the clutch spring 68 rotates with clutch member 62 linearly moving valve 72 decreasing the effective area of apertures 73 exposed within chamber 60 thereby providing for a higher effective vacuum in the servomotor control chamber 43. The increased vacuum pressure in chamber 43 draws movable wall 38 against stop block 44 thereby moving the throttle rod 24 opening the throttle 28 to again establish the set vehicle speed. Should the vehicle speed tend to increase above the set speed, the valve member 72 is moved in a slightly leftward direction increasing the area of apertures 73 permitting a higher atmospheric pressure in the servomotor control chamber 43. The servomotor assembly 20 then expands moving wall 38 away from stop block 44 allowing the throttle to partially close and again establish the set speed.

As is the usual mode of operation with vehicle cruise controls of this type, rapid depression of the vehicle brake pedal opens the normally closed brake switch 122 and the cruise control system is rendered ineffective. This results in immediate deenergization of the solenoid actuating coil 80 allowing the spring 76 to bias control cam member 74 downwardly between ends 134 of spring 68 disengaging clutching member 62 from the spring 68.

Figure 2:
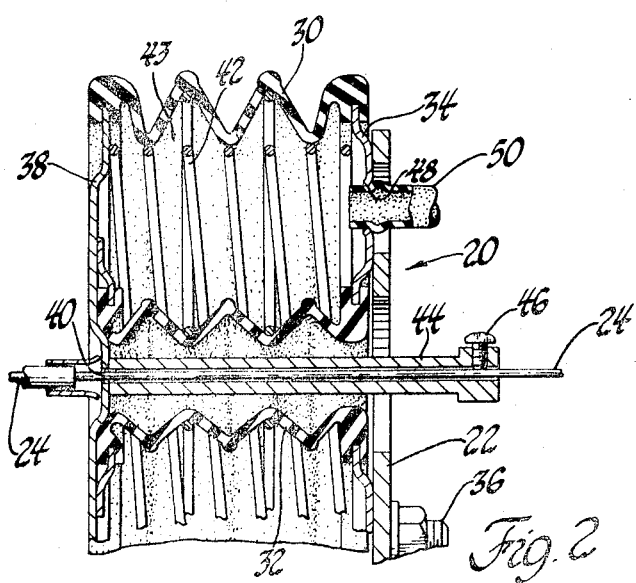
FIG. 2 is a fragmentary cross-sectional view of the servomotor assembly in a partially contracted position.

Referring now to FIG. 2 the servomotor assembly 20 is shown in a partially contracted position wherein movable plate 38 has engaged stop block 44 to move control rod 24 toward a throttle open position as is required when the vehicle speed drops below the set speed. It is readily apparent that the stop block 44 can assume various forms and yet be adjustably positioned relative to the movable wall 38 as long as it is fixed relative to control rod 24 while the throttle is closed. It is significant that the servomotor assembly 20 is concentrically disposed about the control rod 24 and that the stop block 44 is substantially contained within the servomotor assembly for engagement by the wall 38 since this arrangement provides a compact and easily installed unit.

While the improved structure of the servomotor assembly 20 has been specifically described in relation to a vehicle cruise control system it is apparent that the servomotor could readily be used in any system requiring movement of a rod in response to fluid pressure variations. Therefore it is obvious that the above description of the servomotor assembly is not intended to limit application of the device but merely to specifically illustrate one advantageous use of the assembly.

I claim:

1. A servomotor assembly of the type used to actuate a control rod in response to fluid pressure changes comprising a pleated cylindrical bellows assembly concentrically disposed about the control rod, said bellows assembly comprising an inner cylindrical surface isolating the control rod from a fluid control chamber within said bellows assembly, a fixed wall secured to one end of said bellows assembly, a movable wall secured to the other end of said bellows assembly, said walls, and said bellows assembly forming a fluid control chamber, a coil spring disposed within said control chamber biasing said walls apart, a stop member slidably and fixedly adjustably positioned on said control rod for engagement by said movable wall in response to fluid pressure changes in said control chamber, said stop member being positioned exteriorly of said bellows assembly adjacent one end of said inner cylindrical surface whereby said stop member can readily be adjusted on said control rod when said bellows assembly is in a normally unactuated expanded position, and means connected to said fixed wall for supplying pressure fluid to said control chamber whereby said control rod is actuated in response to fluid pressure changes therein.

* * * * *